Feb. 28, 1939.    G. T. REICH    2,148,712
MULTIPLE EFFECT DISTILLATION OF ALCOHOLIC LIQUIDS AND THE LIKE
Filed Nov. 11, 1936
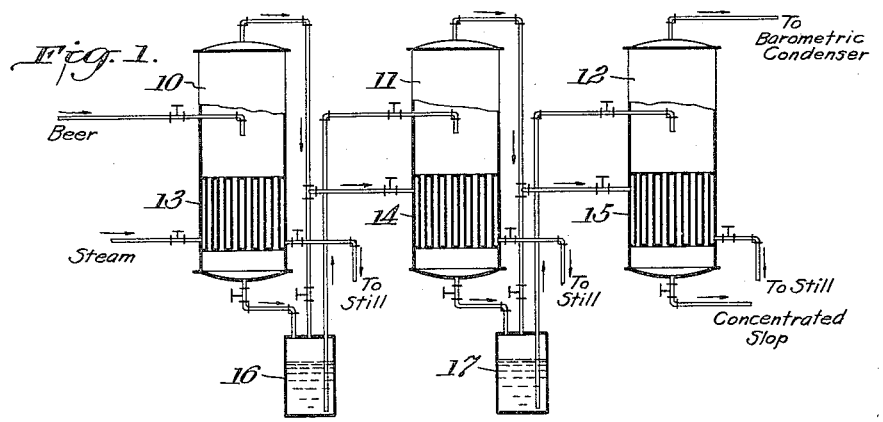
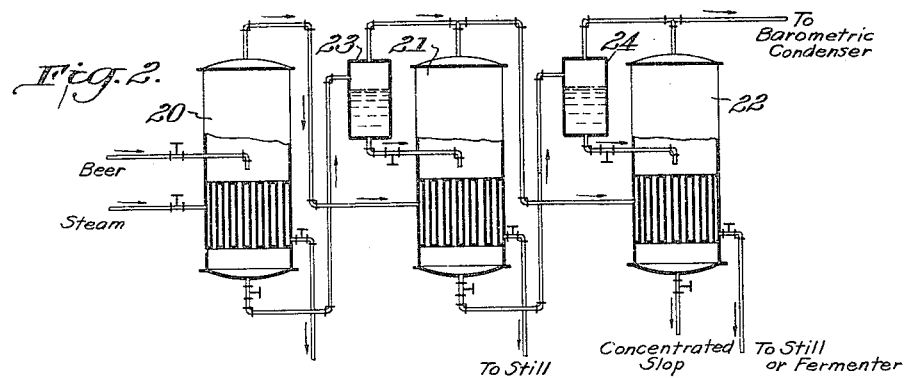
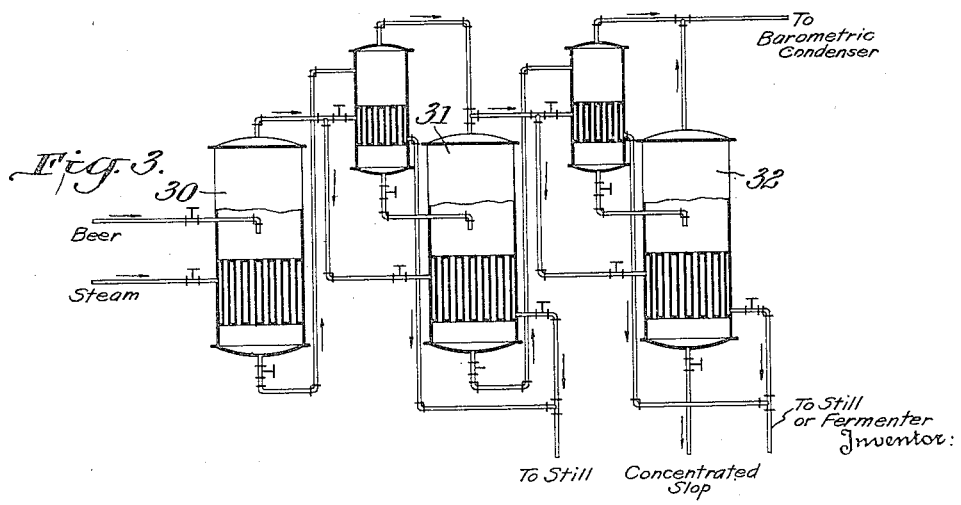

Patented Feb. 28, 1939

2,148,712

UNITED STATES PATENT OFFICE 2,148,712

MULTIPLE EFFECT DISTILLATION OF ALCOHOLIC LIQUIDS AND THE LIKE

Gustave T. Reich, Philadelphia, Pa.

Application November 11, 1936, Serial No. 110,339

10 Claims. (Cl. 202—45)

This invention relates to methods and apparatus for the multiple-effect distillation of liquids containing volatile organic compounds, particularly of alcoholic liquids obtained by the fermentation of saccharine liquids, technically known as "beers".

In my United States Patent No. 2,053,111 I have described a method of multiple-effect evaporation, comprising a plurality of cycles. At the beginning of the first cycle liquid from the first effect is permitted to flow continuously into the second effect, while the liquid outlet from the second is closed, until the liquid in the second effect reaches a predetermined level. Thereafter, the liquid communication between the first and second effects is closed and the residual alcoholic content of the liquid in the second effect is completely removed while liquid is allowed to accumulate until a predetermined level is reached. At this point the residual liquid in the second effect is permitted to flow into the third effect or into an intermediate flow equalizing means, such as a storage tank. The liquid outlet from the second effect is now closed and accumulated liquor in the first effect is allowed to flow into the second effect, beginning a new cycle.

I have now found that the disadvantage of operating the evaporators at varying levels may be to a large extent avoided and that smoother operation and increased evaporator capacity may be obtained by inserting in the liquid conduits between the effects storage vessels connected with the vapor conduit from either the preceding or the succeeding effect. When the storage vessels are connected with the vapor line from the succeeded effect, a further advantage in operation can be obtained by heating the liquid in the storage vessels by indirect heating with a portion of the vapor from the preceding effect so that the storage vessels become, in effect, intermediate evaporators operating in parallel with the succeeding effect.

The invention will be more particularly described with reference to the accompanying drawing which shows illustrative arrangements of apparatus embodying the principles of the invention.

In the drawing:

Fig. 1 is a diagrammatic representation of an arrangement of apparatus in which the intermediate vessels are connected to the vapor line of the preceding effect;

Fig. 2 is a diagrammatic representation of an arrangement in which the intermediate vessels are connected to the vapor line of the succeeding effects; and Fig. 3 is a diagrammatic representation of an arrangement in which the intermediate vessels are connected to the vapor line of the succeeding effect and are indirectly heated by means of vapor from the preceding effect.

In Fig. 1, 10, 11 and 12 are evaporators having steam chests or calandrias 13, 14 and 15, respectively. The evaporators are connected for multiple effect evaporation, evaporator 10 being heated by steam, vapors from evaporator 10 passing to calandria 14 of evaporator 11, and vapors from evaporator 11 passing to calandria 15 of evaporator 12. The vapor space of evaporator 12 is connected to a source of vacuum through a barometric condenser, not shown. Intermediate storage container 16 is connected by a valve-controlled conduit to receive liquor from evaporator 10, and a valve-controlled conduit is also provided for the passage of liquor from container 16 to evaporator 11. The upper part of container 16 is connected with the vapor conduit leading from evaporator 10 to the calandria of evaporator 11. Intermediate storage container 17 is similarly connected between evaporators 11 and 12.

In operation, beer is fed into evaporator 10 and the major portion of the alcohol or other volatile organic compounds contained therein is evaporated therefrom, the alcoholic vapors passing to calandria 14 of evaporator 11 where they are condensed and passed to a still for rectification. The liquid in evaporator 10 is preferably maintained at substantially constant level by drawing off liquor into container 16. The residual alcoholic content of the liquid effluent from evaporator 10 is completely removed in evaporator 11. This is effected by filling the evaporator with liquid to a predetermined level from container 16 while maintaining evaporation therefrom, the flow of liquid out of evaporator 11 being shut off. When the predetermined level in evaporator 11 is reached the feed of liquid from container 16 is shut off and evaporation is continued until the liquid is completely dealcoholized, the vapors passing to the calandria of evaporator 12 where they are condensed and the condensate passed to a still for rectification or to other recovery means.

When the liquid in evaporator 11 is completely dealcoholized it is run into container 17 and liquid from container 16 is again fed into evaporator 11. The dealcoholized liquid in container 17 is fed, preferably substantially continuously, into evaporator 12 where it is evaporated to a concentrated slop which is drawn off for further treatment. By connecting containers 16 and 17 with the vapor lines from evaporators 10 and 11, respectively, the liquid therein may be drawn into evaporators 11 and 12, respectively by the lower pressures maintained in these evaporators over evaporators 10 and 11, respectively.

In the apparatus shown in Fig. 2 evaporators 20, 21 and 22 are connected in the same way as evaporators 10, 11 and 12 in Fig. 1. Intermediate container 23, however, is connected to the vapor line from evaporator 21, and intermediate container 24 is connected to the vapor line from evaporator 22.

The operation of this apparatus is substantially the same as that of Fig. 1 except that because of the connection of the containers to the vapor lines of the succeeding evaporators the liquid is drawn from the preceding evaporators by virtue of the higher vacuum in the succeeding evaporators and the liquid may be fed from the containers into the succeeding evaporators by gravity flow. Moreover because of the higher vacuum exerted on the liquid in the containers a certain amount of evaporation takes place therein.

In the apparatus shown in Fig. 3 the arrangement and connection of the evaporators 30, 31 and 32, and intermediate vessels 33 and 34 is the same as in Fig. 2, but in addition a portion of the vapors from evaporators 30 and 31 is passed into heating chests or calandrias in vessels 33 and 34, respectively. In this way the vessels 33 and 34 become, in effect, intermediate evaporators, operating in parallel with evaporators 31 and 32 as respects vapor flow and heating medium, and in series with these evaporators as respects liquid flow.

It will thus be seen that by the provision of intermediate containers between the effects of a multiple effect evaporator the invention provides for the complete and efficient removal of volatile organic compounds from liquids while evaporating the residual liquids to a useful concentrate. The arrangements shown by way of example are illustrative only and may be varied to a wide extent and combined with other features, for example, with rectifying columns operating as additional or parallel effects as described in my copending application Serial No. 109,027, filed November 3, 1936.

I claim:

1. In the multiple effect evaporation of aqueous liquids containing volatile organic compounds wherein the liquid is fed into the first effect of a multiple effect evaporator which is indirectly heated with steam and the liquid is thereafter further evaporated in successive effects operating under increasingly lower pressures which are indirectly heated by the vapors developed in the immediate preceding effects, the improvement which comprises passing liquid substantially continuously from the first effect into a chamber maintained under a pressure at least as low as that of the second effect, periodically evaporating substantially all of the residual organic compound from the liquid in the second effect without removing liquid therefrom, thereafter passing the liquid from the second effect into a second chamber maintained under a pressure at least as low as the third effect, thereafter feeding accumulated liquid in the first chamber into the heated zone of the second effect, and independently feeding liquid from the second chamber into the heated zone of the third effect.

2. In the multiple effect evaporation of aqueous liquids containing volatile organic compounds wherein the liquid is fed into the first effect of a multiple effect evaporator which is indirectly heated with steam and the liquid is thereafter further evaporated in successive effects operating under increasingly lower pressures which are indirectly heated by the vapors developed in the immediate preceding effects, the improvement which comprises passing liquid substantially continuously from the first effect into a chamber maintained under a pressure at least as low as that of the second effect, periodically evaporating substantially all of the residual organic compound from the liquid in the second effect without removing liquid therefrom, thereafter passing the liquid from the second effect into a second chamber maintained under a pressure at least as low as the third effect, thereafter feeding accumulated liquid in the first chamber into the heated zone of the second effect, and substantially continuously feeding liquid from the second chamber into the heated zone of the third effect.

3. In the multiple effect evaporation of aqueous liquids containing volatile organic compounds wherein the liquid is fed into the first effect of a multiple effect evaporator which is indirectly heated with steam and the liquid is thereafter further evaporated in successive effects operating under increasingly lower pressures which are indirectly heated by the vapors developed in the immediate preceding effects, the improvement which comprises passing liquid substantially continuously from the first effect into a chamber maintained under the pressure of the first effect, periodically evaporating substantially all of the residual organic compound from the liquid in the second effect without removing liquid therefrom, thereafter passing the liquid from the second effect into a second chamber maintained under the pressure of the second effect, thereafter feeding accumulated liquid in the first chamber into the heated zone of the second effect, and independently feeding liquid from the second chamber into the heated zone of the third effect.

4. In the multiple effect evaporation of aqueous liquids containing volatile organic compounds wherein the liquid is fed into the first effect of a multiple effect evaporator which is indirectly heated with steam and the liquid is thereafter further evaporated in successive effects operating under increasingly lower pressures which are indirectly heated by the vapors developed in the immediately preceding effects, the improvement which comprises passing liquid substantially continuously from the first effect into a chamber maintained under the pressure of the second effect, periodically evaporating substantially all of the residual organic compound from the liquid in the second effect without removing liquid therefrom, thereafter passing the liquid from the second effect into a second chamber maintained under the pressure of the third effect, thereafter feeding accumulated liquid in the first chamber into the heated zone of the second effect, and independently feeding liquid from the second chamber into the heated zone of the third effect.

5. In a multiple effect evaporation of aqueous liquids containing volatile organic compounds wherein the liquid is fed into the first effect of a multiple effect evaporator which is indirectly heated with steam and the liquid is thereafter further evaporated in successive effects operating under increasingly lower pressures which are indirectly heated by the vapors developed in the immediate preceding effects, the improvement which comprises passing liquid substantially continuously from the first effect into a chamber maintained under the pressure of the second effect, periodically evaporating substantially all of the residual organic compound from the liquid in the second effect without removing liquid therefrom, thereafter passing the liquid from the second effect into a second chamber maintained under the pressure of the third effect, thereafter feeding accumulated liquid in the first chamber into the heated zone of the second effect, independently feeding liquid from the second chamber into the heated zone of the third effect, and indirectly heating the first chamber with a portion of the vapors from the first effect.

6. In the multiple effect evaporation of aqueous liquids containing volatile organic compounds wherein the liquid is fed into the first effect of a multiple effect evaporator which is indirectly heated with steam and the liquid is thereafter further evaporated in successive effects operating under increasingly lower pressures which are indirectly heated by the vapors developed in the immediately preceding effects, the improvement which comprises passing liquid substantially continuously from the first effect into a chamber maintained under the pressure of the second effect, periodically evaporating substantially all of the residual organic compound from the liquid in the second effect without removing liquid therefrom, thereafter passing the liquid from the second effect into a second chamber maintained under the pressure of the third effect, thereafter feeding accumulated liquid in the first chamber into the heated zone of the second effect, independently feeding liquid from the second chamber into the heated zone of the third effect, and indirectly heating the second chamber with a portion of the vapors from the second effect.

7. In the multiple effect evaporation of aqueous liquids containing volatile organic compounds wherein the liquid is fed into the first effect of a multiple effect evaporator which is indirectly heated with steam and the liquid is thereafter further evaporated in successive effects operating under increasingly lower pressures which are indirectly heated by the vapors developed in the immediately preceding effects, the improvement which comprises passing liquid substantially continuously from the first effect into a chamber maintained under the pressure of the second effect, periodically evaporting substantially all of the residual organic compound from the liquid in the second effect without removing liquid therefrom, thereafter passing the liquid from the second effect into a second chamber maintained under the pressure of the third effect, thereafter feeding accumulated liquid in the first chamber into the heated zone of the second effect, independently feeding liquid from the second chamber into the heated zone of the third effect, and indirectly heating the first and second containers with a portion of the vapors from the first and second effects respectively.

8. In the multiple effect evaporation of aqueous liquids containing volatile organic compounds wherein the liquid is fed into the first effect of a multiple effect evaporator which is indirectly heated with steam and the liquid is thereafter further evaporated in successive effects operating under increasingly lower pressures which are indirectly heated by the vapors developed in the immediately preceding effects, the improvement which comprises passing liquid substantially continuously from the first effect into a chamber maintained under a pressure at least as low as that of the second effect, periodically evaporating substantially all of the residual organic compound from the liquid in the second effect without removing liquid therefrom, thereafter passing the liquid from the second effect into a second chamber maintained under a pressure at least as low as the third effect, thereafter feeding accumulated liquid in the first chamber into the heated zone of the second effect, independently feeding liquid from the second chamber into the heated zone of the third effect, and condensing vapors developed in the first chamber by indirect heat exchange with liquid under a pressure lower than that in said chamber.

9. In the multiple effect evaporation of aqueous liquids containing volatile organic compounds wherein the liquid is fed into the first effect of a multiple effect evaporator which is indirectly heated with steam and the liquid is thereafter further evaporated in successive effects operating under increasingly lower pressures which are indirectly heated by the vapors developed in the immediately preceding effects, the improvement which comprises passing liquid substantially continuously from the first effect into a chamber maintained under the pressure of the first effect, periodically evaporating substantially all of the residual organic compound from the liquid in the second effect without removing liquid therefrom, thereafter passing the liquid from the second effect into a second chamber maintained under the pressure of the second effect, thereafter feeding accumulated liquid in the first chamber into the heated zone of the second effect, independently feeding liquid from the second chamber into the heated zone of the third effect, and condensing vapors developed in said chambers by indirect heat exchange with liquid under a pressure lower than that in said chambers.

10. In the multiple effect evaporation of aqueous liquids containing volatile organic compounds wherein the liquid is fed into the first effect of a multiple effect evaporator which is indirectly heated with steam and the liquid is thereafter further evaporated in successive effects operating under increasingly lower pressures which are indirectly heated by the vapors developed in the immediately preceding effects, the improvement which comprises passing liquid substantially continuously from the first effect into a chamber maintained under the pressure of the second effect, periodically evaporating substantially all of the residual organic compound from the liquid in the second effect without removing liquid therefrom, thereafter passing the liquid from the second effect into a second chamber maintained under the pressure of the third effect, thereafter feeding accumulated liquid in the first chamber into the heated zone of the second effect, independently feeding liquid from the second chamber into the heated zone of the third effect, and condensing vapors developed in the first chamber by indirect heat exchange with liquid under the pressure of the third effect.

GUSTAVE T. REICH.

CERTIFICATE OF CORRECTION.

Patent No. 2,148,712.　　　　　　　　　　　　　　February 28, 1939.

GUSTAVE T. REICH.

It is hereby certified that error appears in the printed specification of the above numbered patent requiring correction as follows: Page 2, first column, line 60, and second column, lines 8, 31 and 75, claims 1, 2, 3, and 5 respectively, for the word "immediate" read immediately; and that the said Letters Patent should be read with this correction therein that the same may conform to the record of the case in the Patent Office.

Signed and sealed this 11th day of April, A. D. 1939.

Henry Van Arsdale (Seal)　　　　　　　　　　　　　　　　　Acting Commissioner of Patents.